United States Patent
Threadgill

(10) Patent No.: US 6,692,085 B1
(45) Date of Patent: Feb. 17, 2004

(54) WHEEL COVER SHIELD

(75) Inventor: William T. Threadgill, Asheboro, NC (US)

(73) Assignee: William T. Threadgill, Jr., Asheboro, NC (US)

( * ) Notice: Subject to any disclaimer, the term of this patent is extended or adjusted under 35 U.S.C. 154(b) by 0 days.

(21) Appl. No.: 10/392,498

(22) Filed: Mar. 20, 2003

(51) Int. Cl.⁷ .................................................. B60B 7/00
(52) U.S. Cl. .............................. 301/37.103; 301/37.104
(58) Field of Search ...................... 301/37.101, 37.103, 301/37.104; 239/104; 118/504

(56) References Cited

U.S. PATENT DOCUMENTS

| | | | |
|---|---|---|---|
| 4,874,206 A | 10/1989 | Sampson | |
| 5,423,599 A | 6/1995 | Sherod et al. | |
| 5,435,630 A | * 7/1995 | Tucker | 301/37.103 |
| 5,524,972 A | 6/1996 | Cailor et al. | |
| 5,785,389 A | 7/1998 | Bradford | |
| 6,179,387 B1 | * 1/2001 | Nasset et al. | 301/37.102 |
| 6,227,623 B1 | * 5/2001 | Bellow | 301/37.42 |
| 6,425,639 B1 | * 7/2002 | Getzelman | 301/37.103 |
| 6,585,329 B2 | * 7/2003 | Crump | 301/37.103 |

* cited by examiner

Primary Examiner—S. Joseph Morano
Assistant Examiner—Jason R. Bellinger
(74) Attorney, Agent, or Firm—Dougherty, Clements & Hofer

(57) ABSTRACT

The invention is wheel cover shield apparatus for masking a wheel or a wheel cover during the application of a spray foam cleaner of tire gloss. The apparatus includes a flanged concave round base that has an ergonomic apical non-slip handle and a planar sectional outer flange with an engaging locking means. The apparatus also includes at least one substantially planar ring for a given diameter wheel. Each ring is interchangeable with the base and has a variable width annular plane with an outer fillet edge and a coextensive inner flange. The inner flange has an engagable locking means. The engagable locking means has two to eight receptacles with a raised ridge or depression on the inner flange. The engaging locking means has two to eight sockets with a depression of raised ridge.

11 Claims, 4 Drawing Sheets

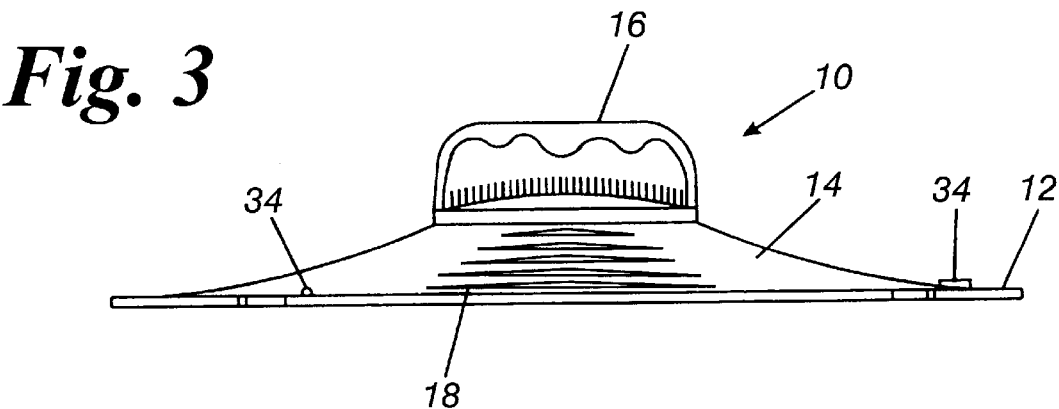
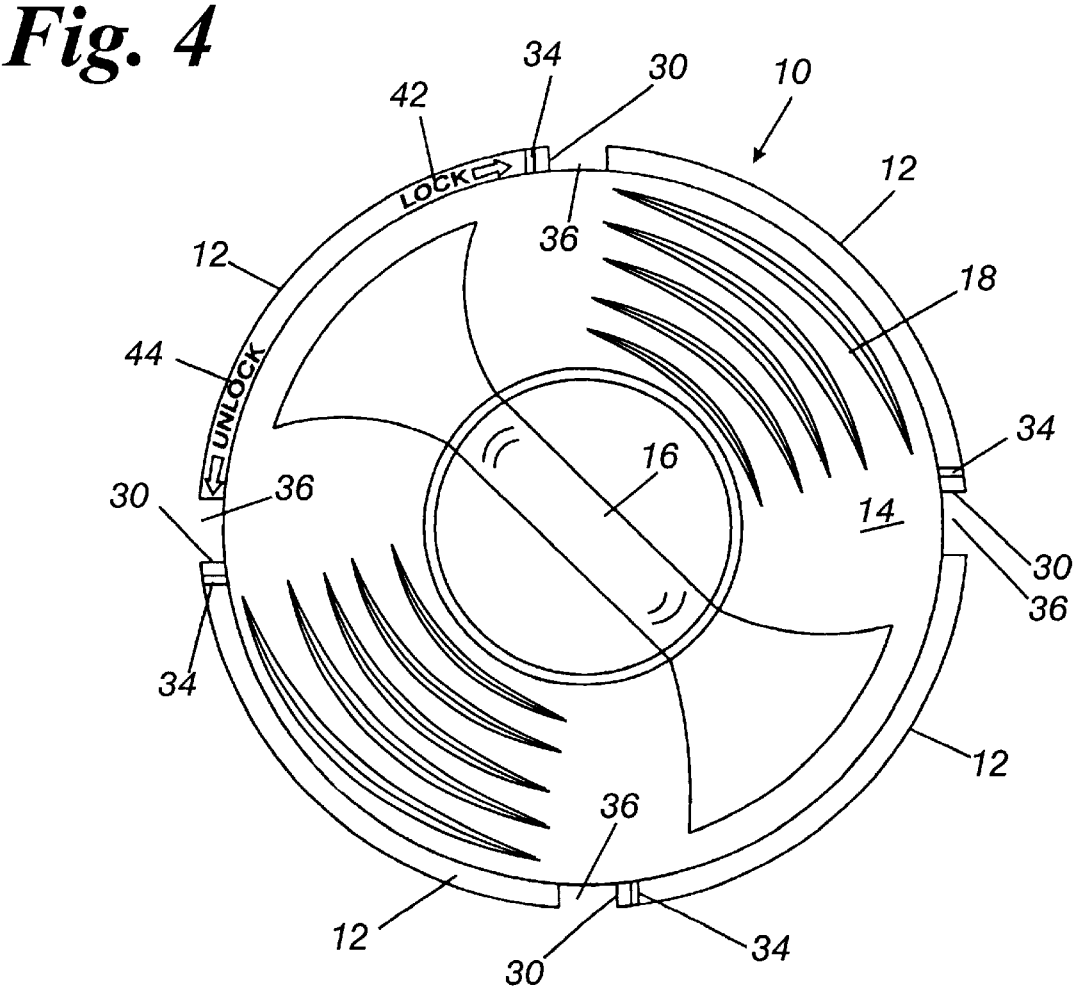

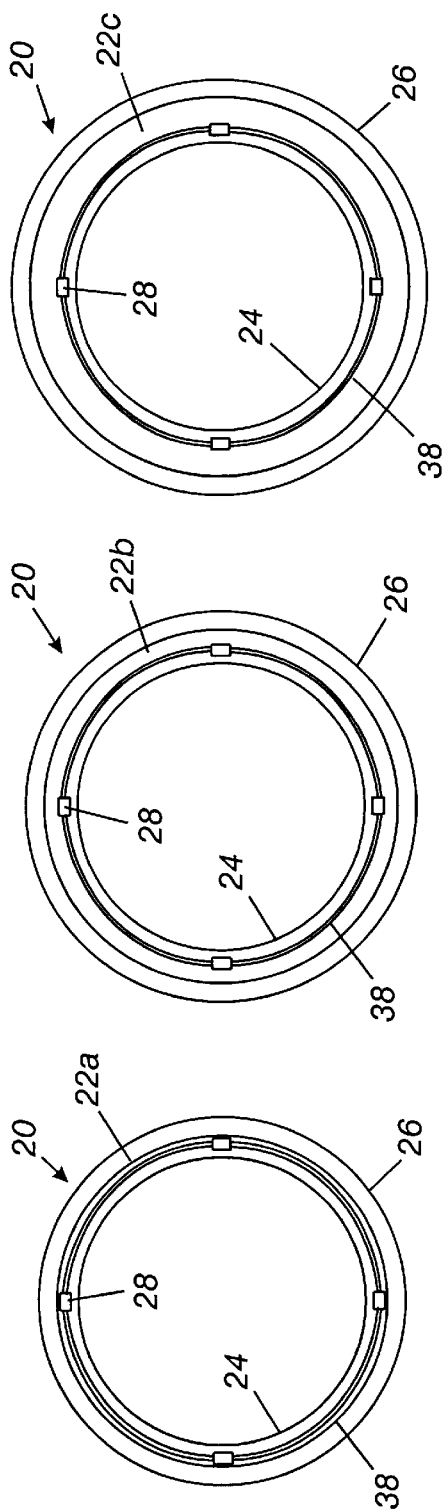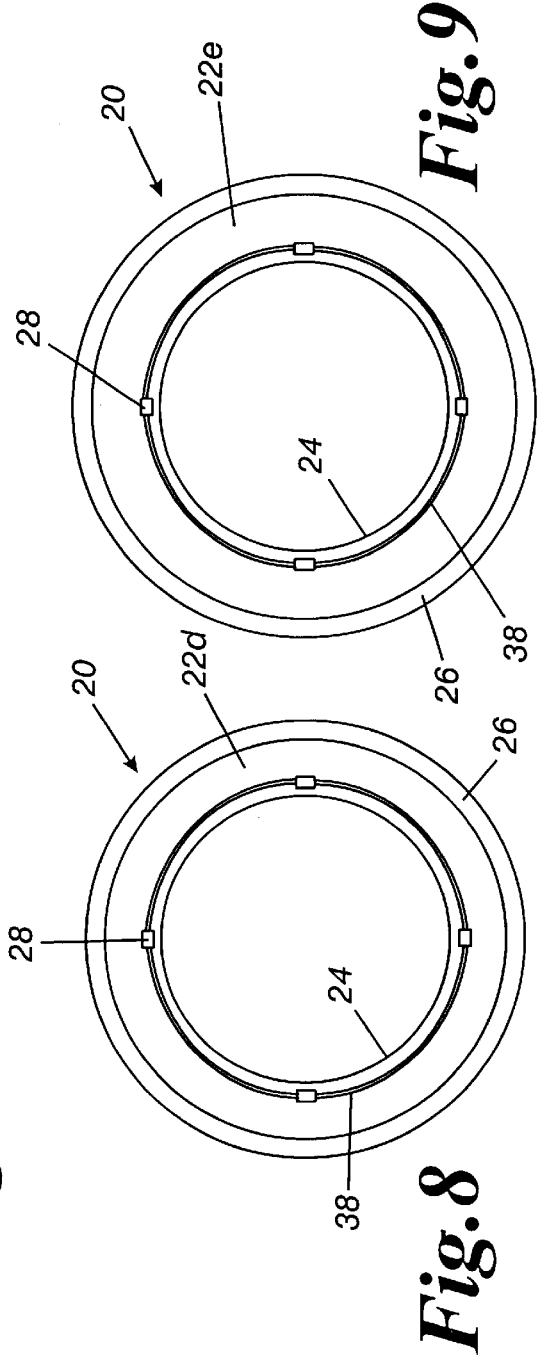

WHEEL COVER SHIELD

FIELD OF THE INVENTION

The present invention relates to apparatus for masking wheels, and more particularly to apparatus for protecting wheels while they are being washed or glossed.

BACKGROUND OF THE INVENTION

The appearance and life of vehicular tires can be improved by cleaning (either by washing or applying a foaming tire cleaner), and/or then spraying on a tire gloss. The tire gloss and the foaming tire cleaner should be kept off the wheel as, at best they will leave a residue, and in some cases can stain or even be corrosive to the wheel or wheel cover (hub cap). Accordingly, there is a need for a protective removable wheel cover shield which will prevent mag wheels, customized wheels (i.e. chromed wheels, wheels with knock-offs), and wheel covers from being sprayed undesirably during the application of tire gloss or tire cleaner. The wheel cover shield preferably should be easily positioned over the wheel, held in place during spraying and easily removed. The wheel cover shield should preferably be available in various diameters to fit the assorted size wheels and wheel covers.

Applicant is aware of the following U.S. Patents concerning the art of protecting wheels during the application of tire gloss.

U.S. Pat. No. 4,874,206, Sampson discloses a mag tire wheel and wheel cover shield with a generally cylindrical flat flexible resilient disc of paper, plastic, or metal designed to cover the outer face of a mag tire wheel or wheel cover so that the tire can by sprayed with a polish or coating without spraying the wheel cover or mag wheel. The disc has a handle on the outer surface to help hold the disc against the mag wheel or wheel cover. A hard shield may extend outwardly from the disc handle to protect the user's hand against spraying.

U.S. Pat. No. 5,423,599, Sherod et al. discloses a detachable wheel mask for temporarily covering an entire wheel of an automobile during washing and protecting the wheel from dirt while cleaning. The wheel mask includes a circular protective cover of a size corresponding with the wheel, a retaining element for fitting within a formed between the wheel rim and the tire to secure the protective cover to the wheel rim enclosing the wheel and a handle.

U.S. Pat. No. 5,524,972, Cailor et al. teaches that a wheel mask to protect the vehicle wheels during chemical treatment of the tires is a thin plastic molding having a circular concave body that includes a central hub having an exterior handle. The handle is inwardly open and formed of walls which project outwardly of the hub and are tapered to permit partial insertion of a handle of another mask, and the ridge walls are angled outwardly to enhance stacking of a plurality of masks.

U.S. Pat. No. 5,785,389, Bradford discloses a wheel and wheel cover shield having a resilient shield member surface defined partially by a curved shield edge and having a shield surface area less than the surface area of the wheel or wheel cover to be protected. A handle assembly extending from the shield member including a hand grip.

A desirable feature in a wheel cover shield is that it is non-abrasive so that during use the shield will not scratch the wheel or the wheel cover. Also desirable is that the shield is sufficiently flexible and conforming that it is sealing. Weights are usually added to the rim to balance the wheel mounted with a tire, and particularly with mag wheels the weights can interfere with the seal, thereby creating an opening that allows tire gloss spray to seep onto the wheel or wheel cover. The wheel cover shield is sufficiently flexible to at least partially deform, therein covering the protruding weight. Another problem commonly encountered during the use of wheel cover shields is caused by a protruding air stem. An air stem is located inboard of the rim, and can protrude beyond the rim, thereby preventing the shield from sealing. Long air stems are often found on wheels fitted with wheel covers that simulate spoked or mag wheels. The wheel cover shield must be stiff enough that it can deflect the air stem, thereby maintaining a seal between the shield and the rim.

Furthermore, the wheel cover shield should be relatively inexpensive, resistant to chemicals, and sufficiently shock resistant that it does not easily break if dropped. The handle must enable the user to securely grip the wheel cover shield, even when the shield is covered with a slippery liquid.

Additionally, the wheel cover shield preferably is adjustable such that a single wheel cover shield can be modified for masking a range of wheel diameters. The wheel cover shield should desirably have an adjustable means that is quick, simple, accurate and durable. For instance, the process of changing the wheel cover shield from a 13 inch diameter wheel shield to a 15 inch diameter wheel shield should be quick, where quick is under 30 seconds. The process should be simple, where simple is defined as not requiring tools. The process of changing the wheel cover shield from one diameter wheel shield to another diameter wheel shield should be accurate, where accurate is defined as reproducibly forming a wheel cover shield, wherein the diameter of the shield is within a few thousandths of an inch of the desired diameter, and the shield has substantially no elipticity (e.g. it is perfectly circular). The adjustable shield is durable, wherein durable is defined as forming a good seal, an effective mask, and where under normal use the shield is interlocked (e.g. the adjustable means does not become dislodged or loosened) and the shield still meets all the operative criteria as previously enumerated.

SUMMARY OF THE INVENTION

The wheel cover shield is comprised of a base that is a substantially concave round discoid that is stiffened with rib-like ridges, where said base has an ergonomic apical non-slip handle and a planar sectional outer flange that has an engaging locking means; and a ring for a given size wheel, where the ring is comprised of a specific width annular plane with a fillet edge and, coextensive with the annular plane, an inner flange, which has an engagable locking means; wherein when the base is fitted with any ring the outer flange overlaps and is coaxial with the inner flange; and the engaging locking means is reversible secured by the engagable locking means.

The ring for a given size wheel is appropriately sized by using a width of the annular plane that extends the diameter of the ring, such that the diameter is sufficient to extend the fillet edge slightly beyond the rim of the wheel. A wider wheel requires a wider ring, and there is correspondingly a ring with an annular plane having a greater breadth. The dimensions of the inner flange of the ring and the outer flange of the base stay constant. This constancy enables one base to be universally adaptable for mounting rings ranging from 12–25 inches. It is anticipated that the rings can also be constructed so that a smaller diameter base can be used with smaller diameter rings, and a larger diameter base can be use with larger diameter rings.

The preferred locking means is comprised of an engaging locking means and an engagable locking means, where the engagable locking means is a receptacle with a raised retaining ridge or a depression, and the engaging locking means is a socket with a depression or a raised resisting ridge, wherein following the insertion of the socket into the receptacle, the base and ring are reversibly locked. The planar sectional outer flange is preferably symmetrically sectioned, such that the outer flange is comprised of two to eight angular sectional lengths separated by a comparable number of angular sectional spaces where there is no flange. The width of any given angular sectional space is wider than the angular length of the receptacle on the inner flange, such that prior to locking the ring and the base, the receptacles on the inner flange are intermeshed between the angular sectional spaces of the outer flange and the inner flange is flush with the outer flange. The leading edge of an angular sectional length on the outer flange is in effect an angular socket. By holding the ring stationary and rotating the base, the angular sockets are plugged into the angular receptacles. Raised ridges or depressions within the receptacle and on the socket prevent the socket from becoming unplugged. The degree of difficulty of unplugging is controlled by varying the morphological features of the raised ridges or depressions on the socket and the receptacle. The relative rigidity of the receptacle also affects the degree of difficulty. In the instant invention, the locking means is designed to be relatively easy to unlock so that switching rings is quick and simple, and undue torque is not required. The ring will not become unlocked unless the ring held and the base is counter rotated, therein unplugging the angular sectional length from the corresponding receptacle. In a preferred embodiment of the invention, a leading edge of the angular section length has a radial ridge, and an entrance to the corresponding receptacle has a radial ridge, such that the socket can only enter when the entrance slightly widens under the force of the socket being pushed against the receptacle.

The base is preferably constructed so that it is relatively rigid through the selection of materials, reinforcement using ribbed ridges and the overall thickness of the base. The rings are constructed to be flexible enough so as to effect a good seal against the rim. The rings are preferably comprised of a plastic that is relatively tough. The fillet edge slopes away from the annular plane forming a lip that will slightly overlap the rim. The ring preferably does not have any ribbed ridges for reinforcement, but may have sectional lines along the perimeter of the inner flange to help center the base over the ring for a given size wheel.

The rings are preferably individually labeled with embossed or raised or decaled or printed lettering that indicates the wheel diameter. The wheel shield cover apparatus is used as follows. The diameter of the wheel is determined, and then the appropriate matching ring is mounted on the base. The shield is grasped and held with one hand, centered over the wheel, such that the rim and the rest of the wheel are masked. With another hand the spray is applied to the tire, and distributed smoothly over the tire.

OBJECTS OF THE INVENTION

The principal object of the invention is to provide an improved apparatus for protecting wheels and wheel covers during the application of tire gloss.

A further object of the invention is to provide an apparatus that will not be abrasive to a wheel or wheel cover.

Another object of the invention is to provide apparatus for shielding an assorted size of wheels and wheel configurations, wherein the diameter of the shield is adjustable, and the components of the apparatus are interchangeable.

A final object of the invention is to provide a wheel cover shield that has an adjustable means that is quick, simple, accurate and durable.

BRIEF DESCRIPTION OF THE DRAWINGS

The foregoing and other objects will become more readily apparent by referring to the following detailed description and the appended drawings in which:

FIG. 3 is a side view of the base.

FIG. 4 is a top view of the base.

FIG. 5 is a planar view of a ring for shielding a thirteen inch wheel.

FIG. 6 is a planar view of a ring for shielding a fourteen inch wheel.

FIG. 7 is a planar view of a ring for shielding a fifteen inch wheel.

FIG. 8 is a planar view of a ring for shielding a sixteen inch wheel.

FIG. 9 is a planar view of a ring for shielding a seventeen inch wheel.

DETAILED DESCRIPTION

Figure 1:
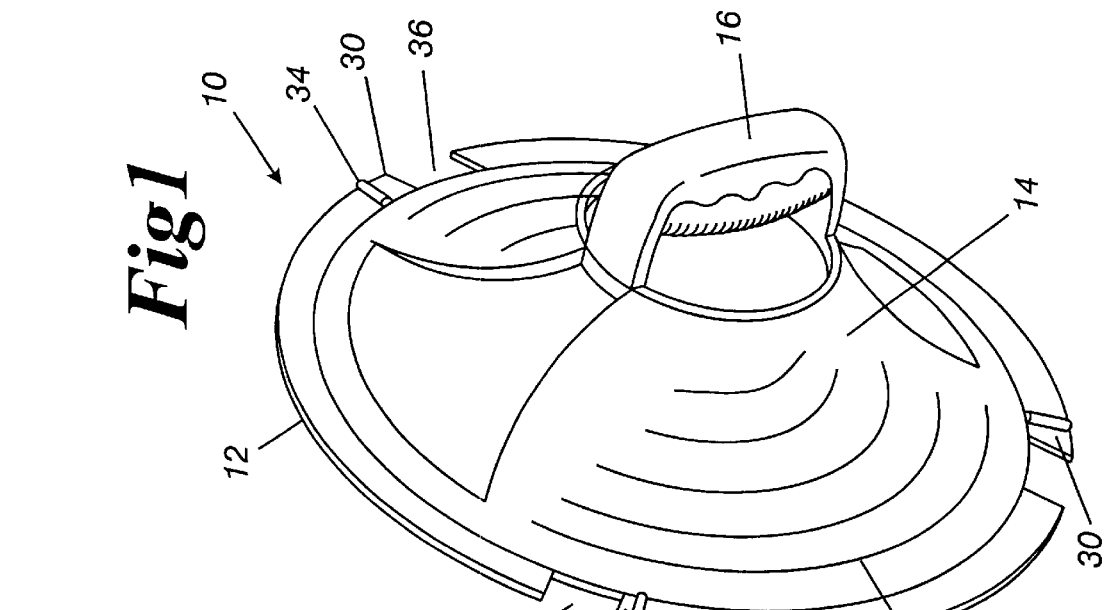
FIG. 1 is a perspective drawing of the base, which is a flanged discoid of the invention, a wheel cover shield.
Figure 2:
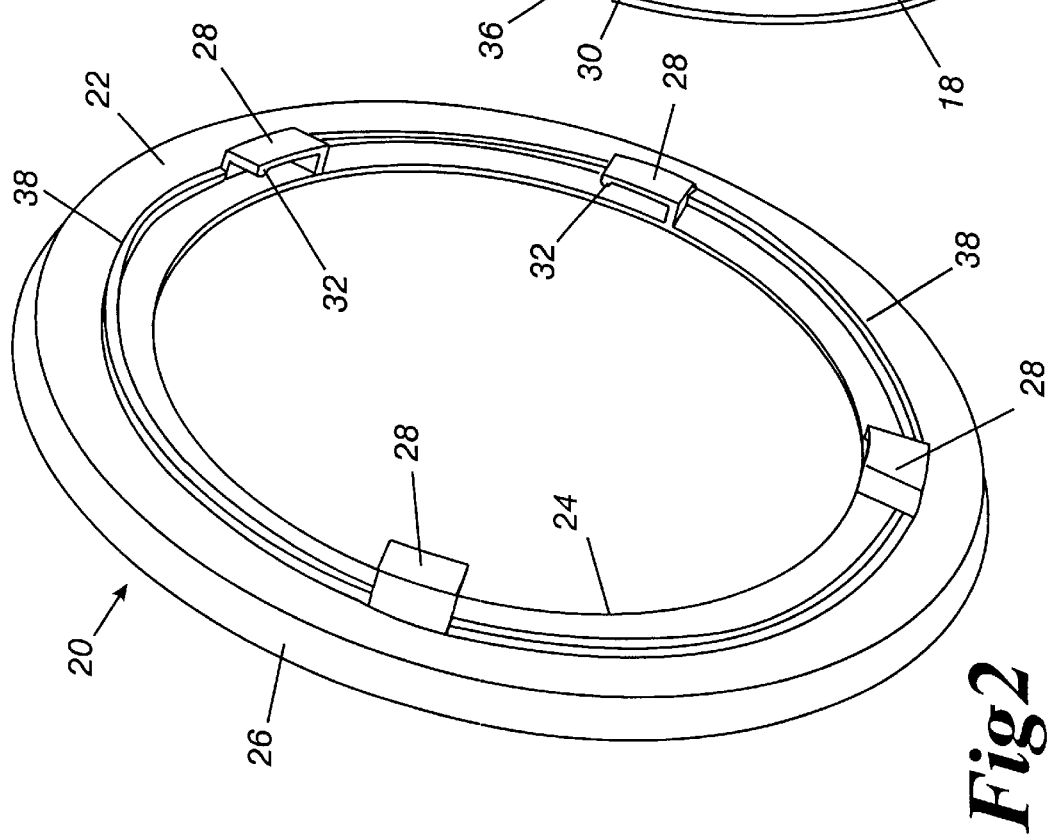
FIG. 2 is a perspective drawing of a ring, which attaches to the base, therein forming the wheel cover shield.
Figure 10:
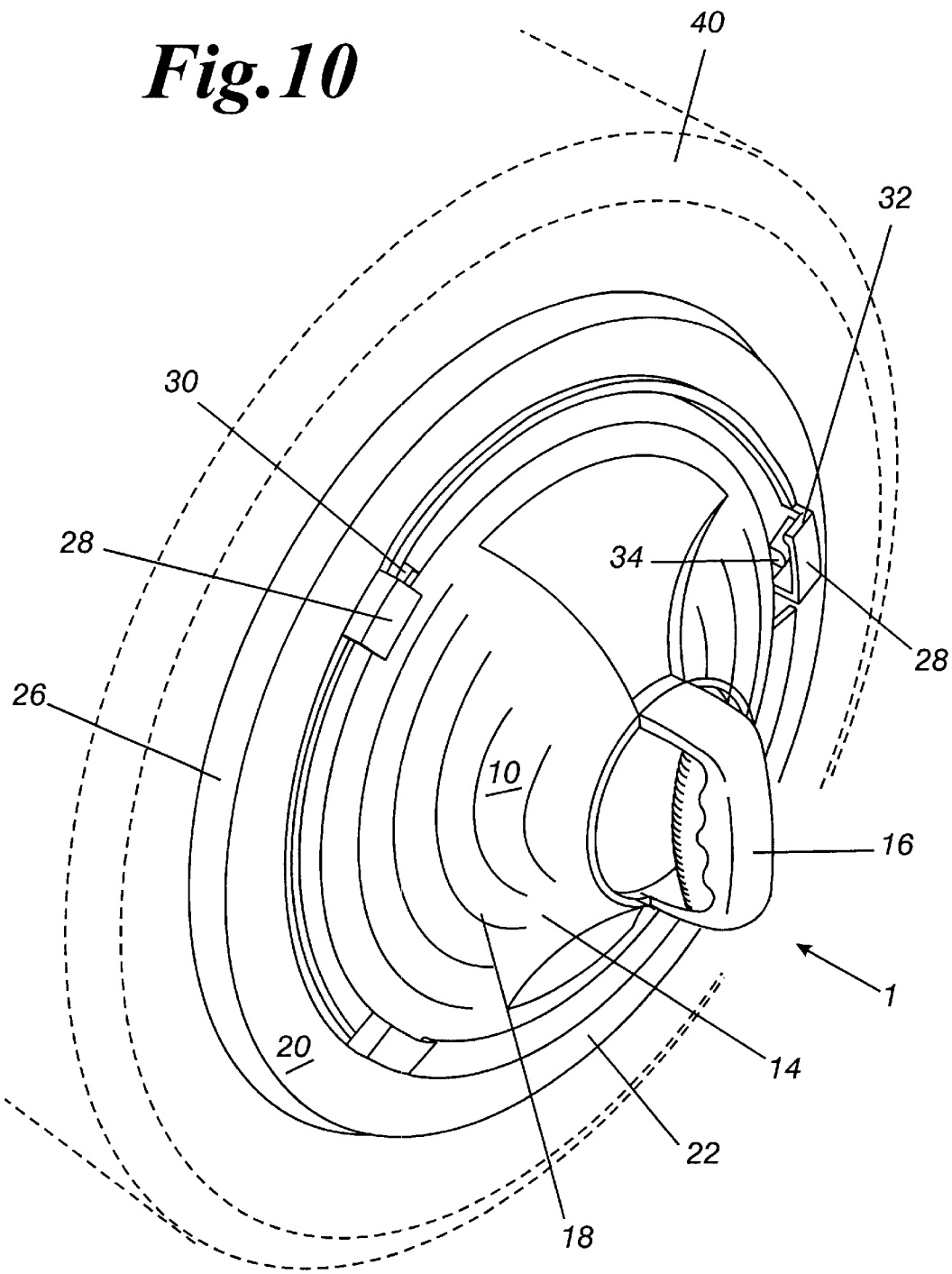
FIG. 10 is a perspective view of the wheel cover shield 1 as it would be used to cover the wheel or wheel cover during application of a gloss. The wheel tire is shown in phantom as indicated by the dash lines.

The invention is a wheel cover shield 1, as shown in FIG. 10 on wheel tire 40. The wheel cover shield is comprised of a base 10 that is substantially a concave round discoid 10 that is stiffened with ribbed ridges 18. The base 10 has an ergonomic apical non-slip handle 16 and a planar sectional outer flange 12, which are shown more clearly in FIG. 1. Referring to FIG. 10, the wheel cover shield 1 also comprises a series of interchangeable rings, where a ring is selected to match a given size wheel. The ring 20 has a specific width angular plane 22, a fillet edge 26 and an inner flange 24 (not shown), which is coextensive with the annular plane 22. As shown in FIG. 4 and in FIG. 1, the base has four engaging locking means, which are sockets 30 having a locking ridge, and a space 36 which is sufficiently wide to allow the engagable locking means on the ring to project through the space 36. The engagable locking means as shown in FIG. 2 is comprised of four receptacles 28 that align with the sockets 30 on the base 10. The receptacles 28 are located on the inner flange 24 of the ring 20. The receptacles have a retaining ridge 32 which is shown in FIG. 10. A ring is attached to a base 10 by positioning the base 10 over the ring 20 and rotating the base relative to the ring so that the socket 30 slides into the receptacle 28. The locking ridge 34 on the socket 30 is restrained by the retaining ridge 32 of the receptacle 28. The locking ridge 34 can only slide by the retaining ridge 32 when there is sufficient force to cause the receptacle 28 to distort slightly. This prevents the ring from accidently disengaging during the use of the invention. Referring to FIG. 2, the ring has sectional lines 38 which help align the base with the ring. The rings are made out of a substantially tough rubbery material, while the base is made out of a substantially stiff plastic. When the wheel cover shield 1 is positioned, the fillet edge 26 of the ring lips over the rim of the wheel, forming a seal, which shields spray from the wheel cover, mag wheels, or knock offs. As shown in FIG. 3, the base is a substantially concave discoid 14, where the degree of curvature of the concave discoid is sufficient to allow for wheel covers that project beyond the rim. The rings are of sufficient diameter so as to account for over-spray. The base 10 as shown in FIG. 4 is labeled on the outer flange 12 with the words "lock" 42 and "unlock" 44. The labeling tells the user the direction the base is to be rotated when attaching (or detaching) a different size ring. The handle as shown from the side in FIG. 3 has grip ridges so as to prevent the handle from slipping in the user's hand even when the handle is wet. The base 10 of the wheel cover shield 1 can be fitted with substantially any size ring that is suitable for masking the wheel or wheel cover. In FIGS. 5–9, the rings are proportionally illustrated for various size wheels. FIG. 5 show a ring suitable for 13 inch wheels, FIG. 6 is for 14 inch wheels, FIG. 7 is for 15 inch wheels, FIG. 8 is for 16 inch wheels, and FIG. 9 is for 17 inch wheels. Note that the inner flange 24 and the engagable locking means, receptacle 28, and the sectional lines 38 remain constant in size. The ring diameter is increased by increasing the width of the annular plane 22. 22a through 22e are illustrated in FIGS. 5–9 showing that the girth of the annular plane increases as the diameter of the ring increases. While the perimeter of the fillet edge 26 increases with the increased diameter, the degree of overlap over the rim remains substantially the same, and the only functional component that changes size as the ring increases is the annular plane 22.

SUMMARY OF THE ACHIEVEMENT OF THE OBJECTS OF THE INVENTION

From the foregoing, it is readily apparent that I have invented wheel cover shield apparatus for protecting a wheel or a wheel cover during the application of a spray foam cleaner or tire gloss, wherein the apparatus is not abrasive, the apparatus is suitable for shielding an assorted size of wheels and wheel configurations, and wherein the components of the apparatus are interchangeable. It is also apparent that means of switching from one size shield to another is quick, simple, accurate and durable.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Wheel cover shield apparatus for masking a wheel or a wheel cover during the application of a spray foam cleaner or tire gloss, wherein said wheel cover shield apparatus comprises:
    a) a base that has a substantially concave round discoid, a handle and a planar sectional outer flange with an engaging locking means;
    b) at least one substantially planar ring for a given diameter wheel, where each ring is interchangeable with the base and is comprised of a wheel diameter dependent width annular plane that has an outer fillet edge and a coextensive inner flange, wherein the inner flange has an engagable locking means; and
    wherein the outer flange of the base and the inner flange of any given planar ring are overlapping in size and can be interlocked by aligning the flanges and counter rotating the base relative to the ring therein causing the engaging locking means to couple with the engagable locking means; or can be reversibly unlocked by reverse counter rotating the base relative to the ring therein causing the engaging locking means to decouple with the engagable locking means.

2. The wheel cover shield apparatus as claimed in claim 1, wherein the engagable locking means is comprised of two to eight receptacles with a raised ridge or depression on the inner flange of any given ring, and the engaging locking means is comprised of two to eight sockets with a depression or raised ridge, where a socket is an angular sectional length of the planar outer flange, where the outer flange is comprised of two to eight angular sectional lengths separated by a similar number of angular sectional spaces, where a space defines a leading edge of one angular sectional length, and the leading edge has appropriately either a raised ridge or depression.

3. The wheel cover shield apparatus according to claim 2, wherein each of the receptacles has a radial ridge and each of the sockets has a radial ridge, wherein after the socket is plugged and interlocked into the receptacle there is sufficient resistance to prevent the socket and the receptacle from becoming unplugged and unlocked during normal use of the wheel cover shield.

4. The wheel cover shield apparatus as claimed in claim 1, wherein the width of the annular plane is sufficiently narrow that the diameter of the ring is only 12 inches, or sufficiently wide that the diameter of the ring is 25 inches or any intermediate width therein.

5. The wheel cover shield apparatus as claimed in claim 1, wherein the concave round base is stiffened with ribbed ridges.

6. The wheel cover shield apparatus as claimed in claim 1, wherein the concave round base is comprised of relatively rigid plastic.

7. The wheel cover shield apparatus as claimed in claim 1, wherein the rings are comprised of a relatively resilient plastic.

8. The wheel cover shield apparatus as according to claim 1, wherein the fillet edge slopes away from the annular plane forming a lip that will slightly overlap the rim of a wheel.

9. The wheel cover shield apparatus as according to claim 2, wherein the ring has sectional angular lines along the perimeter of the inner flange adjacent to the annular plane, wherein the sectional lines are visual aids that help center the base over the ring when installing a ring on the base.

10. The wheel cover shield apparatus as according to claim 1, wherein the rings are preferably individually labeled with embossed or raised lettering that indicates the diameter of the wheel.

11. The wheel cover shield apparatus as according to claim 1, wherein the handle is an ergonomic, apical, non-slip handle.

* * * * *

UNITED STATES PATENT AND TRADEMARK OFFICE
CERTIFICATE OF CORRECTION

PATENT NO. : 6,692,085 B1　　　　　　　　　　　　　　　　　　　　　　Page 1 of 1
DATED　　　 : February 17, 2004
INVENTOR(S) : William T. Threadgill, Jr.

It is certified that error appears in the above-identified patent and that said Letters Patent is hereby corrected as shown below:

<u>Title page,</u>
Item [75], Inventor, change "William T. Threadgill" to -- William T. Threadgill, Jr. --.

Signed and Sealed this

Twenty-fifth Day of May, 2004

JON W. DUDAS
*Acting Director of the United States Patent and Trademark Office*